3,119,882
CONTROL OF EMULSIONS IN OLEFIN ABSORPTION SYSTEMS USING LECITHIN
Harold G. Whittle, Paramount, and Walter E. Wheeler, Torrance, Calif., assignors to Shell Oil Company, New York, N.Y., a corporation of Delaware
Filed Mar. 19, 1962, Ser. No. 180,804
4 Claims. (Cl. 260—677)

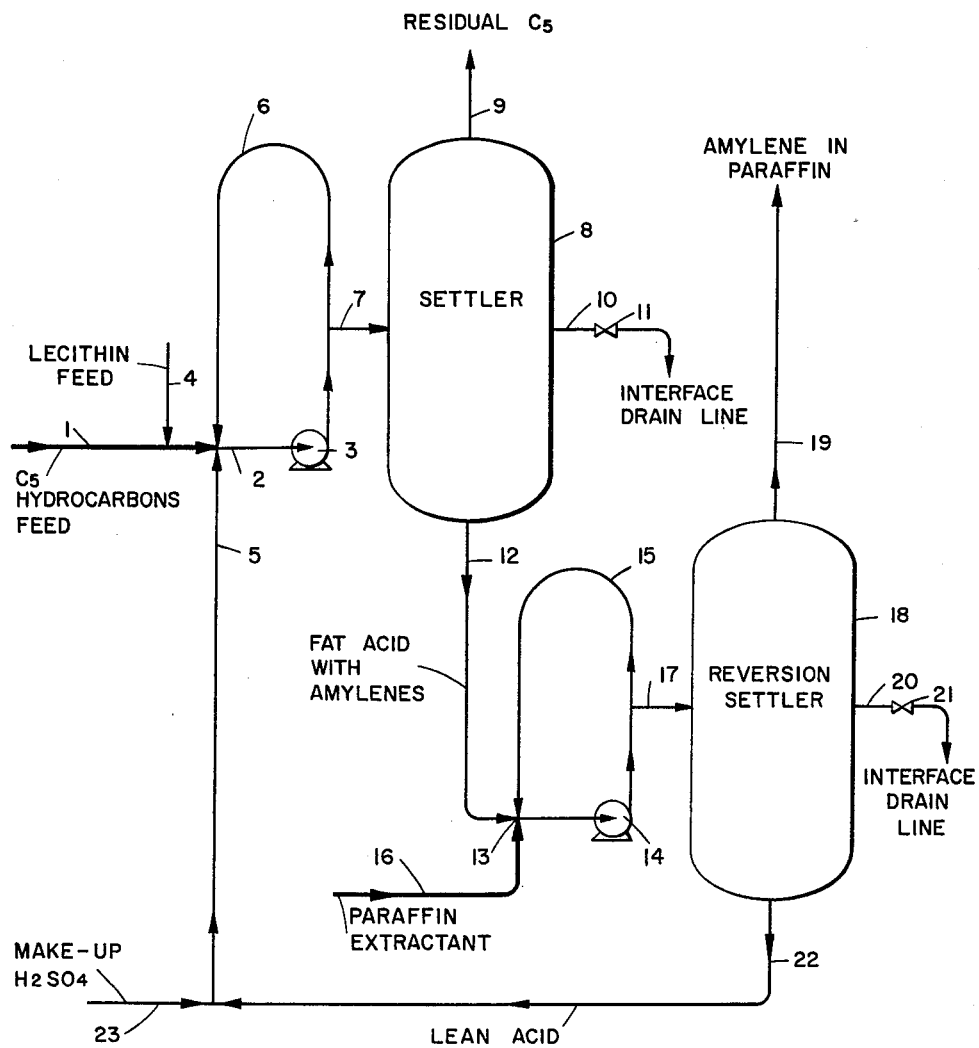

This invention relates to an improved method for separating and recovering tertiary olefins from cracked hydrocarbon fractions and particularly tertiary amylenes from streams containing saturates, monoolefins, and diolefins.

It has been proposed heretofore to separate olefins from saturated hydrocarbons and tertiary olefins from non-tertiary olefins, by selective sorption in sulfuric acid of suitable concentration and by selective desorption or reversion by heating or extraction with another suitable paraffin under appropriate conditions. However, with modifications in cracking conditions, such as more severe catalytic cracking, the lower fractions of four to six carbon atoms often contain substantial proportions of diolefins. In attempting to separate the monoolefins, particularly the tertiary olefins, and especially the tertiary amylenes which are useful for dehydrogenation to isoprene, from cracked $C_5$ fractions, it has been found that considerable material is formed which is neither readily soluble in the hydrocarbon phase nor in the acid phase and as a result thereof a tenacious emulsion layer is formed and phase separation is impaired to such an extent that commercial operation is practically unfeasible.

It is a principal object of the present invention to overcome the serious defects which exist in present processes for the selective sorption separation of tertiary amylenes from cracked hydrocarbon fractions of chiefly five carbon atoms. A further object is to improve the separation of isoamylenes—methylbutenes—particularly tertiary amylenes from $C_5$ hydrocarbons in a $C_5$ hydrocarbon fraction from a cracking process, particularly catalytic cracking.

Now, in accordance with the present invention, it has been found that in the acid, especially sulfuric acid, extraction of olefins from $C_4$ to $C_6$ cracked hydrocarbons, wherein an interfacial emulsion tends to form and increase beyond operable limits, such emulsions are readily reduced and essentially eliminated by the incorporation of a relatively small proportion of a phospholipid, especially lecithin, in the system. The lecithin, well-known as an emulsifier, in some unknown manner serves to minimize the formation and increase of the interfacial emulsion so that the acid phase with absorbed olefins is readily and substantially completely separated from the hydrocarbon and interfacial layers.

By way of illustration, a typical $C_5$ boiling range fraction, obtained from the lighter naphtha portion of a product stream from the fluidized catalytic cracking of a straight-run gas oil fraction under commercial operating conditions for the production of gasoline, contained about 10.7% total $C_4$ hydrocarbons, 0.4% total $C_6$ hydrocarbons, 37.3% pentanes, 49.4% amylenes (including 31.2% tertiary amylenes), and 2.2% $C_5$ diolefins.

It has been proposed in Belgian Patent No. 589,716 to extract tertiary amylenes from a $C_5$ cracked hydrocarbon stream using sulfuric acid of about 40 to 70% wt. concentration at a temperature of about $-10°$ C. to $+20°$ C. and then to recover the tertiary amylenes from the separated fat acid by reversion-extraction therefrom, using a different boiling hydrocarbon, preferably a paraffin or paraffin mixture, at a higher temperature, say from 30–90° C., for a short time, such as less than 15 minutes.

The single figure of the accompanying drawing illustrates a simple flow diagram for the process according to the present invention.

Referring to the drawing, $C_5$ hydrocarbons feed is supplied through line 1 to the suction line 2 of circulating pump 3. A lecithin feed line 4 discharges into the hydrocarbons feed line 1 prior to its discharge into suction line 2 of circulating pump 3. However, the lecithin feed can be added at several alternative places in the process so long as a lecithin is present in the mixture of hydrocarbons and acid prior to their entry into settlers 8 and 18. A lean acid feed line 5 also discharges with the hydrocarbons feed line 1 into the inlet or suction line 2 of circulating pump 3. Pump 3 is provided with a closed circuit loop line 6 to effect the circulation and mixing of the hydrocarbons feed, lecithin and acid.

A discharge line 7 connects circulating loop line 6 with a suitable settler 8, discharging the circulating mixture in the loop into the settler; phase separation occurs in settler 8 with the settling of a lower liquid fat acid phase, comprising lecithin, acid and absorbed amylenes, and a supernatant phase is withdrawn from the upper part of settler 8 for other uses through a discharge line 9.

Settler 8 is provided with an interface drain line 10 containing a valve 11 to enable the removal of excess emulsion bands forming at or near the interface as more fully described hereinafter in the specification.

The fat acid is withdrawn from the lower portion of settler 8 through a discharge line 12 for the reversion portion of the cycle. In this portion of the cycle, the fat acid from settler 8 is discharged into the suction side 13 of a second circulating pump 14. Pump 14 is provided with a closed circuit circulating loop line 15 and the fat acid and paraffin extractant from paraffin feed line 16 both discharge into the suction side 13 of the pump. This closed circuit circulating loop line 15 and pump 14 provide thorough mixing of the fat acid and paraffin extractant and this mixture is withdrawn continuously through the loop discharge line 17 and passed into reversion settler 18.

The amylenes are extracted from the fat acid by the paraffin extractant and the upper extract phase, comprising the paraffin extractant and amylenes, phase separates from the lean acid which settles to the bottom of reversion settler 18. The upper extractant phase in settler 18 is discharged through line 19 and is passed to a suitable fractionating means for separation of amylenes and paraffin extractant.

Similar to settler 8 reversion settler 18 is also provided with an interface drain line 20, controlled by valve 21, to facilitate the removal of emulsion bands which are almost eliminated when using lecithin in the process.

The lower lean acid phase settling to the bottom of the reversion settler 18 retains the lecithin and is passed through a bottom discharge line 22 into the lean acid feed line 5 whereby providing for continuous recycle of the acid. A lean acid makeup feed line 23 provides additional acid for the process when necessary.

The primary extraction of the olefins from the hydrocarbon mixture into the acid is conveniently carried out on a large scale by providing a circulating stream—as by a circulating pump 3 in a closed circuit loop line 6—of acid and hydrocarbon with a settler or phase separator 8 located in the circuit or a parallel branch of part of it. The hydrocarbon stream is fed through feed line 1 to the suction side 2 of the pump 3 and quickly mixed with the acid stream. The volume of hydrocarbon to volume of acid may vary considerably but an approximately 50:50 ratio may generally be employed. Also, the fat acid contains about 15 to 30% wt. of tertiary amyl alcohol (amylene expressed as amyl alcohol). The entire stream or a portion of it is passed through discharge line 7 to a settler 8 where hydrocarbon and acid phases are stratified. The upper denuded hydrocarbon phase is withdrawn through line 9 for other use, as for gasoline blending, while the acid phase, part or all, is withdrawn through line 12 for reversion to recover the absorbed olefins and the acid then returned to the absorption cycle.

Whereas with a mixture of only monoolefinic and saturated $C_5$ hydrocarbons, particularly when the concentration of olefin is relatively low, the phase separation of denuded paraffins and fat acid phases is rapid and relatively sharp, when a catalytically cracked $C_5$ fraction containing only a relatively small proportion of diolefins is processed in the described system, the amount of interfacial emulsion continues to increase with time, and especially if the olefin concentration is appreciable, until after a short time there is no effective separation of acid and hydrocarbon phases and it becomes necessary to remove the entire acid inventory and replace it with fresh acid.

As has been pointed out hereinbefore, a preferred embodiment of the process of the invention is in the use of lecithin as a means for controlling emulsion formation between aqueous sulfuric acid and hydrocarbon streams containing amylenes, as well as other hydrocarbons of greater or less degree of unsaturation.

In order to more fully appreciate the significance of the invention, consideration of the emulsion problem in the selective absorption of tertiary amylenes by 65% sulfuric acid is in order. Following startup of such absorption system on a plant scale, smooth operation without emulsion formation is possible for a period of only about ten days to two weeks following thorough water-flushing of the unit. At such time emulsion formers in the system contribute to a steady increase in the time required for favorable separation of the acid-hydrocarbon emulsion which forms. Stable emulsion layers appear in the phase separator and after about two to three days such stable layers increase to such extent that phase separation of the acid and hydrocarbon is seriously impaired, whereupon the operation of the unit is disrupted. This results in low product purity and extensive caustic demands in the neutralization system. Conventional practice heretofore involves the replacement of as much as, for example, 10,000 gallons of circulating acid with fresh acid as a daily routine in attempting to reject emulsion-formers from the system. In some instances, all of the purge acid is taken from the system by withdrawing the stable emulsion layer from the settler interphases. Such acid purging, including interphase withdrawal through interface drain lines 10 and 20, as a temporary expedient only extends the time until the emulsion becomes uncontrollable and unit shutdown is required to make a complete change of acid. Such complete changes are required every two to three weeks. The direct result of the presence of the uncontrollable stable emulsion in the absorption system amounts to substantial production losses due to a low operating stream factor, poor yields, and extensive loss of acid and neutralizing caustic.

Now, in accordance with the invention, it has been discovered that the injection of small amounts of the phosphatide lecithin is definitive in effecting control of the emulsions formed in the absorption system of the process. The addition of from about 30 p.p.m. to 500 p.p.m. of lecithin to 65% sulfuric acid is recommended, with from about 80 p.p.m. to 200 p.p.m. being preferred. The exact amount to be added will depend in a large measure on economic considerations, as well as adaptability to the particular processing conditions. It has been found that when 1000 p.p.m. is added to 65% sulfuric acid, the surface tension of the acid is lowered to approximately one-half its normal value. Such lowering of the surface tension increases the tendency of the acid and hydrocarbons, such as amylenes, to remain emulsified. Accordingly, in direct contradiction to the known art, the addition of lecithin to the absorption zone of a tertiary amylene recovery system at particular locations therein serves to break and control any emulsion rather than generate it. For example, the addition of lecithin to the feed through lecithin feed line 4 prior to passage thereof through propelling means, such as a centrifugal pump 3, as well as immediately following such passage therethrough but prior to entry of the feed into the absorption zone itself by discharging lecithin into loop line 6 or loop discharge line 7, and again alternatively at a location in the hydrocarbon stream immediately following the removal of such hydrocarbon from the absorption zone, for example, by discharging the lecithin feed into the bottom drain line 12 of settler 8 which is particularly desirable. It is has also been found that when from about 80 p.p.m. to 200 p.p.m. of lecithin, based on the circulating acid, is injected into the system at any place in the system so long as it will be present in the acid and hydrocarbons mixture entering settlers 8 and 18; the phase separation time of the acid-hydrocarbon emulsion is reduced to within reasonably controllable limits. Specifically, about 200 p.p.m. of lecithin is particularly preferred. Following such injection of lecithin into the system, it is found that the emulsion can be controlled so that the necessity for the conventional acid purging is virtually eliminated. In this respect, while employing the process of the present invention, only about 400 gallons per day of interphase material need be drawn off through interface drain lines 10 and 20 from the system containing 20,000 gallons of 65% acid. In the recovery of olefins by absorption, while employing the phosphatide lecithin as set forth in the present process, a major decrease in caustic consumption and a substantial improvement in olefin yield is effected. For example, the ratio of amylenes recovered to amylenes processed increases from 0.55 to 0.70 following the uncontrolled injection of lecithin into the system, and the weight percent of isoamylene in the product improves from below 80% to over 90%. In the plant process described hereinbefore, acid and caustic costs can now be reduced by about $400 per day and acid consumption likewise can now be reduced from about 18% to 5% or less. Moreover, maintenance costs occasioned by corrosion and forced plant shutdowns can now be eliminated by means of practicing the process of the present invention.

While, as has been described in detail, the use of lecithin to control the formation of emulsions at the hydrocarbon-aqueous interphase is useful in connection with the absorptive recovery of $C_4$ to $C_6$ olefins, the following example is illustrative of a preferred embodiment of the invention as employed in conjunction with the absorption of tertiary amylenes into 65% sulfuric acid. However, it is not intended to limit the invention to the exact details as set forth herein but only in accordance with the scope and spirit of the appended claims.

*Example*

A plant run was conducted with the injection of lecithin into the circulating acid-hydrocarbon emulsion, and operation was compared with previous runs without lecithin injection.

During previous runs it had been necessary to purge large quantities (up to 10,000 gal/day) of acid from the system in order to prevent buildup of emulsifying material in the circulating acid. Even with such a large acid replacement, however, settling times were high and consequently throughput was limited in order to allow sufficient residence time in the settlers for adequate phase separation. Often large stable emulsion bands appeared in the settlers forcing reductions in throughput and even entire shutdowns.

During the run using lecithin, throughput was increased to a maximum (subject to other limitations) and settling times were easily controlled at desired maximum of 5 to 8 minutes by injecting lecithin into the absorption reactors and at the inlets to the settlers. Feed rates to the system were 2000–2500 bbl./day hydrocarbon and 1300–1900 bbl./day acid with reactor temperatures of 35–45° F.

Lecithin was injected at average rates of 100–200 parts per million parts of circulating acid. Acid replacement was reduced to 400–500 gal./day.

As the run progressed, the amount of lecithin required to maintain desired settling times increased.

Periodic purging of small quantities of acid at the interface of the settlers 8 and 18 removed some emulsifying material via drain lines 10 and 20 and probably lowered the required amount of lecithin.

Results of the run are interpreted to show that within the limitations placed on plant operations because of equipment and other considerations, lecithin is effective in controlling emulsion settling times at desired levels. There is reason to believe that lecithin would also be effective at higher concentrations (which would probably be necessary for longer runs or with less acid purge) and at other sets of operating conditions for similar systems.

We claim as our invention:

1. In a process for the recovery of tertiary amylenes from a mixture of essentially $C_5$ hydrocarbons including tertiary amylenes, pentanes, and pentadienes by selective absorption in aqueous sulfuric acid of at least 65% strength with the formation of an interfacial emulsion which interferes with the separation of the hydrocarbon and aqueous phases, the improvement of providing a minor amount from about 30 to 500 p.p.m. based on the aqueous acid phase of lecithin to the system to substantially reduce the time of separation of the hydrocarbon and aqueous phases.

2. Process in accordance with claim 1 wherein the amount of lecithin injected into the system is from about 80 to 200 p.p.m. based on the aqueous phase.

3. Process in accordance with claim 1 wherein about 200 p.p.m. of lecithin is used.

4. Process in accordance with claim 1 wherein the pentadienes include cyclopentadiene.

References Cited in the file of this patent

UNITED STATES PATENTS 2,958,715     Sanford et al. _____ Nov. 1, 1960